May 11, 1937. G. L. R. J. MESSIER 2,080,180
DEVICE ENSURING RATIONAL SUSPENSION OF RAILROAD VEHICLES
Filed May 6, 1933 3 Sheets-Sheet 1
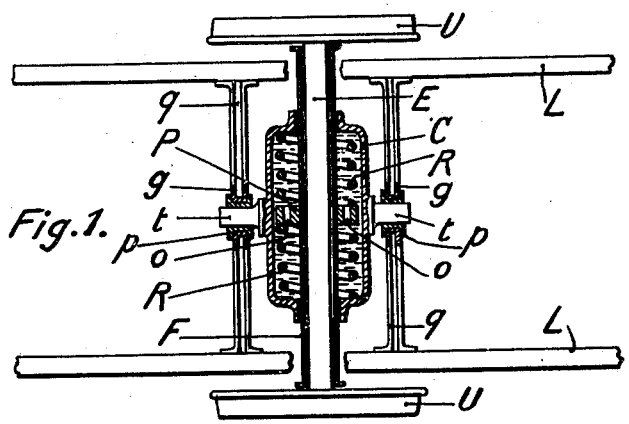
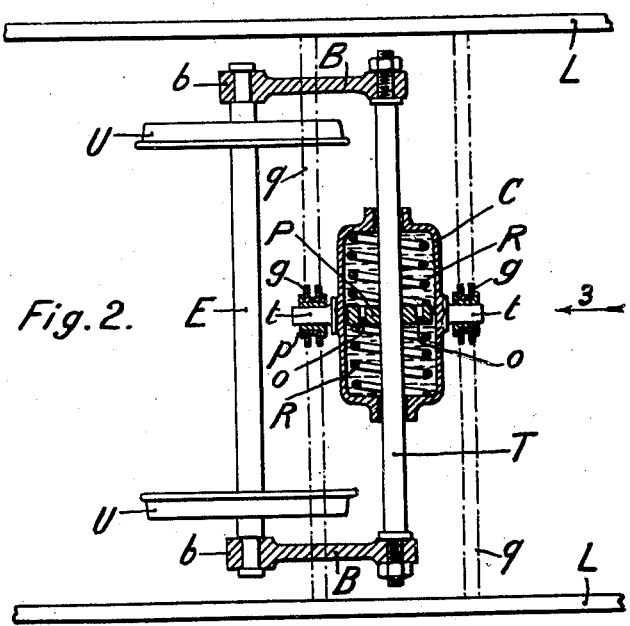
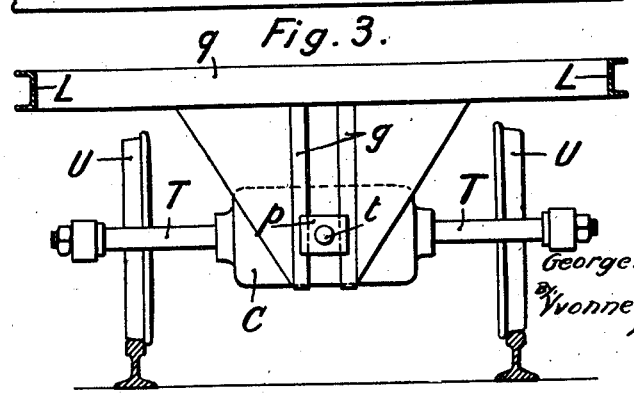
Inventor:
George Louis R. J. Messier,
Deceased,
By Yvonne L. Messier,
Administratrix,
By: Marks & Clerk

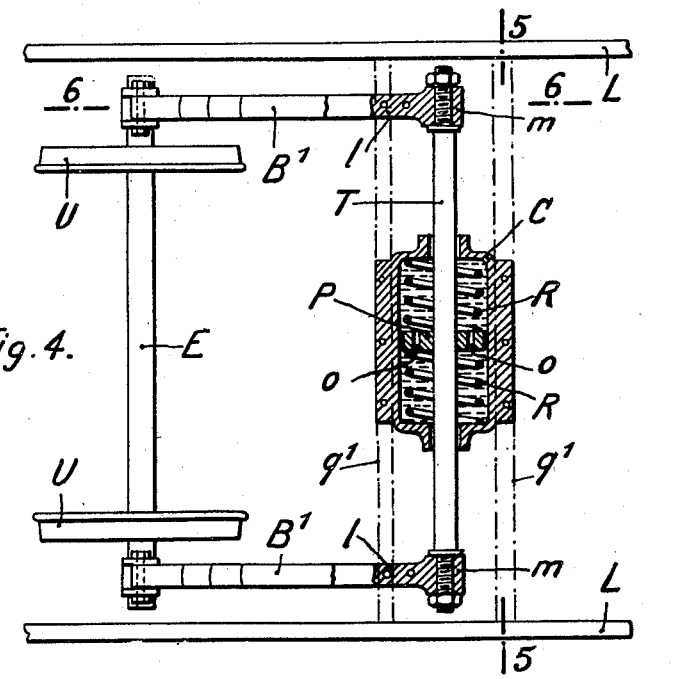
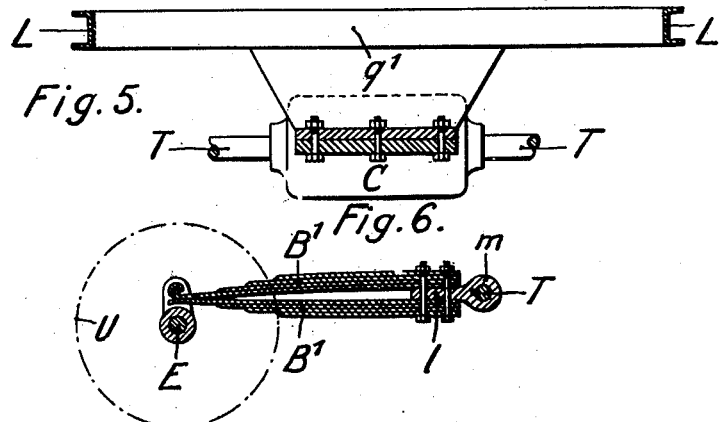
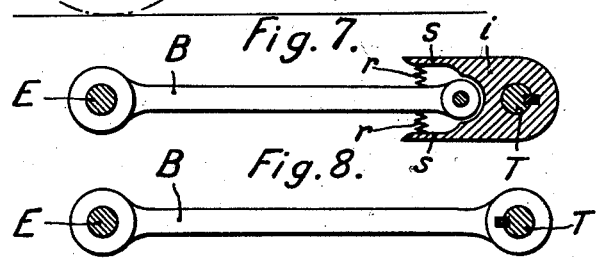

May 11, 1937.  G. L. R. J. MESSIER  2,080,180
DEVICE ENSURING RATIONAL SUSPENSION OF RAILROAD VEHICLES
Filed May 6, 1933  3 Sheets-Sheet 3
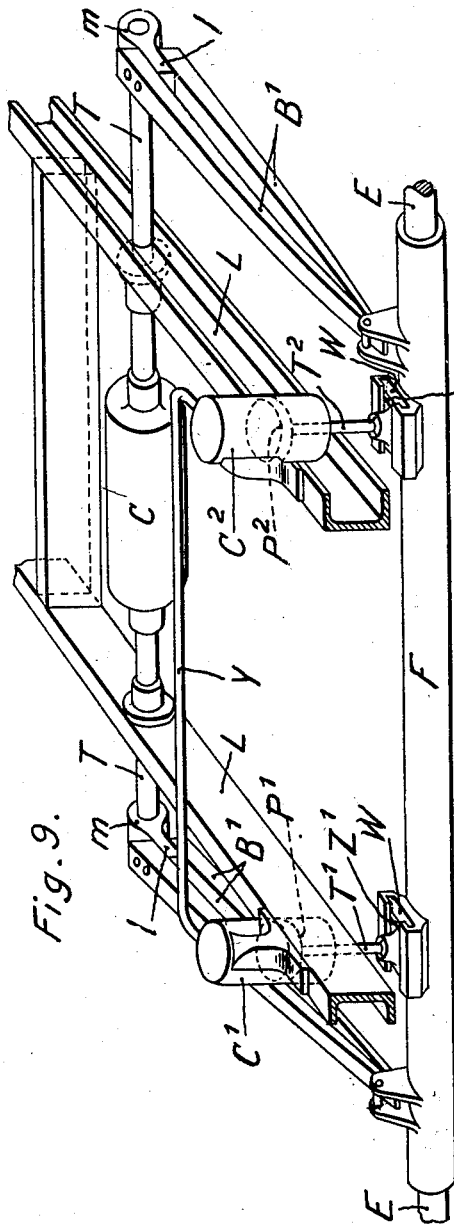
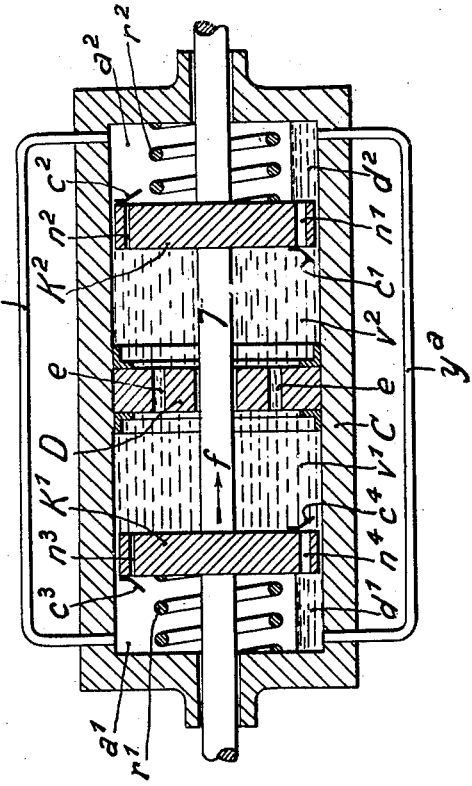
Inventor:
George Louis R. J. Messier,
Deceased,
By, Yvonne L. Messier,
Administratrix
Marks & Clerk
Attys Patented May 11, 1937

2,080,180

UNITED STATES PATENT OFFICE 2,080,180

DEVICE ENSURING RATIONAL SUSPENSION OF RAILROAD VEHICLES

George Louis René Jean Messier, deceased, late of Paris, France, by Yvonne Lucie Messier, born Bonnamy, administratrix, Paris, France Application May 6, 1933, Serial No. 669,771
In France May 10, 1932

1 Claim. (Cl. 105—171)

The suspension systems actually used on railroad vehicles do not usually comprise any means allowing to avoid side shocks or hunting movements which take place when the axles tend to transversely move relatively to the underframe of the vehicle.

In actual systems, the connection of the axles and of the underframe is rigid transversely to the railway track.

The present invention is adapted to provide, between the axles and the underframe, a rational connection, particularly in the transverse direction, and it is characterized by the fact that, between the axles and the underframe, are interposed damping systems reacting against the side displacements of the axle, the suspension systems proper, which support the load, being so devised as to allow a certain lateral displacement of the axle relatively to the underframe, or to the bogie of the vehicle.

The accompanying drawings illustrate various simple or combined forms of construction of this damping system.

Fig. 1 is a horizontal section of the lateral damping system, in a form of construction in which it is centered on the axle.

Fig. 2 is a view corresponding to Fig. 1, in which the damping system is external to the axle.

Fig. 3 is a rear view of the damping system as seen in the direction indicated by the arrow 3 of Fig. 2.

Fig. 4 is a view corresponding to Fig. 2 and also shows a device preventing rolling movements by means of resilient arms.

Fig. 5 is a section made according to line 5—5 of Fig. 4.

Fig. 6 is a section made according to line 6—6 of Fig. 4.

Figs. 7 and 8 illustrate two constructional modifications of the device preventing rolling movements.

Fig. 9 is a diagrammatic perspective view of a device ensuring advantageous suspension of the vehicle.

Fig. 10 is an axial section of a constructional modification of the lateral damping device.

The damping system checking the relative lateral displacements of the axle E and of the underframe, is constituted by a cylinder or like casing C, filled with a liquid, such as oil, and which, transversely to the railway track, participates to permit the displacements of the side sills L—L of the underframe.

When, as is most frequently the case, the axle E rotates with the wheels U, this axle will be surrounded by a tube F. On this tube is secured a piston P, dividing the cylinder C into two compartments and in which are provided orifices o of reduced cross section.

Springs R, interposed between the piston P and each of the heads of the cylinder C constantly tend to restore the cylinder and, consequently, the underframe, to a mean position corresponding to that which the underframe must occupy, when at rest, relatively to the wheels.

If, from any cause whatever, a relative movement occurs between the system composed of the wheels, axle and tube, and the underframe, the oil, forced, from one compartment of the cylinder C to the other through the narrow orifices o, checks this movement and absorbs the shocks. When the perturbing action has ceased, the springs R restore the system to its mean position.

This damping device being adapted to be combined with suspension members reacting against the vertical components of the relative displacements of the wheels and side sills, it is necessary that the cylinder C should be able to follow the movements of the axle in a direction vertical or inclined relatively to the plane of the side sills, whilst remaining rigid with the latter when transverse displacements occur.

Various means can be employed for that purpose.

For instance, as illustrated in Figs. 1 to 3, the cylinder can be provided with two trunnions $t$, journalled in bearings $p$, forming slide-blocks, vertically guided between two slides $g$, rigid with the side sills L through the medium of a cross member $q$.

In the example shown in Fig. 2, the device for damping the lateral displacements, which has just been described, is external to the axle.

This axle rotates within axle boxes $b$ rigid with arms B which are secured to the ends of a rod T carrying the piston P.

The devices shown in Figs. 1 to 3 do not offer any resistance to the rolling movements of the vehicle, for instance owing to a pronounced inclination when passing a curve.

For avoiding these rolling movements, the lateral damping systems will be combined, according to the invention, with stabilizing-righting devices.

These stabilizing devices do not oppose any resistance to the relative vertical displacements of the underframe and of the axle when these parts remain parallel.

On the contrary, as soon as the axle and the underframe incline relatively to each other, this stabilizing device offers to this relative displacement a resilient resistance limiting this inclination and acting for restoring the parallelism of the underframe and axle.

The said stabilizing devices comprise:

(a) A transverse shaft freely rotating in two sockets or bearings directly or indirectly carried by the underframe.

(b) Two arms, secured at both ends of this transverse shaft and connected, by joints, to both ends of the axle.

(c) A resilient device allowing both arms to have different angular displacements when a relative inclination of the underframe and axle takes place, but opposing a resistance which limits this inclination.

Figs. 4 to 7 illustrate a first form of construction of such a device preventing rolling movements, combined with the lateral damping device which constitutes the main feature of the invention.

In these figures, the said rigid transverse shaft is, in fact, constituted by the piston rod T. The latter can freely rotate in the cylinder C which, in this case, is rigid with the side sills L, being secured on a cross member $q^1$ connecting the latter. At the ends of this rod T are rigidly mounted two resilient arms $B^1$ connected to the axle E by suitable joints.

Each of the resilient arms $B^1$ can be constituted, as shown in Fig. 6 of the accompanying drawings, by two springs composed of short stepped leaves and applied against each other in such a manner that their concave faces are opposite one another. These springs are secured, at one of their ends, on the flange $l$ of a sleeve $m$ keyed on the rod T.

In another form of construction (shown in Fig. 7) of these devices preventing rolling movements, the arms B are rigid but are resiliently mounted on the rod T; a resilient connection (constituted by two springs $r$—$r$, arranged on either side of the arm and supported by bearing portions $s$—$s$ of a fork piece $i$ keyed on the rod T) allow the arms to incline in one direction or the other relatively to the rod T, but encountering in each direction a resilient resistance.

Finally, the stabilizing device preventing rolling movements can derive its resiliency from the rod T itself. The arms B are then rigid or resilient and the rod T is constituted by two sections on which these arms are respectively keyed (Fig. 8); the said arms are connected by a device allowing a relative rotary movement of these two sections by opposing to this movement a resilient resistance tending to restore them to their initial position. The rod T can also be so devised as to constitute a torsion spring.

For carrying out all these systems, it is obviously necessary to provide, for the suspension devices, springs or the like, connecting the axle to the underframe, a special arrangement allowing the axle to have a certain lateral play relatively to the underframe of the vehicle or to the bogie. These lateral damping devices, combined or not with members preventing rolling movements, of the above mentioned type, can be particularly associated with pneumatic or oleo-pneumatic suspension devices.

The vehicle is thus provided with a complete suspension opposing resilient resistances to all relative vertical, horizontal or inclined displacements of the axle and underframe.

Fig. 9 of the accompanying drawings is a diagrammatic perspective view showing the use of such a combination which constitutes, per se, an important feature of the invention.

The side sills carry two pneumatic or oleo-pneumatic cylinders $C^1$, $C^2$, the upper part of which can be put in communication with a compressed air tank, whilst their lower part directly communicates or not with the atmosphere.

In these cylinders can move pistons $P^1$, $P^2$, respectively, the rods $T^1$, $T^2$ of which follow the vertical displacements of the tube F and can laterally move relatively to the latter, being guided for that purpose by any suitable means, for instance by slide-blocks $Z^1$, $Z^2$ movable in a slide W of said tube F. A pipe Y can, if need be, ensure the communication between the cylinders $C^1$, $C^2$ for permanently balancing the pressures in the latter, in order to satisfy certain conditions of operation, capable of reducing the consumption of compressed air. The slides can be eliminated by arranging on the rods $T^1$, $T^2$, a link having a spherical member.

In all the combined systems which have just been described for checking lateral movements and preventing rolling movements, it is necessary to ensure the fluid-tightness of the cylinder C at the place where the piston-carrying rod or tube passes.

Fig. 10 illustrates a constructional modification rendering absolute fluid-tightness unnecessary between the said rod and the cylinder. This is fully shown and described in Patent No. 2,029,829, granted to applicant Feb. 4, 1936 on a divisional application filed March 16, 1934.

In all these lateral damping devices, the connections between the cylinder and the piston or pistons might be inverted, the former becoming rigid with the axle and the latter with the side sills, as far as the lateral displacements are concerned.

Finally, devices allowing to control the cross section of the orifices formed in the pistons might be provided, for allowing the liquid to flow from one compartment to the other compartment of the cylinder, that is to say, for causing the degree of flexibility of the damping device to vary.

What is claimed as the invention and desired to be secured by Letters Patent is:

System for the rational suspension of railroad vehicles, comprising an underframe, an axle, a cylinder following the lateral displacements of the underframe, a liquid filling this cylinder, in this cylinder a piston following the lateral displacements of the axle, narrow orifices in the piston, means acting for constantly restoring the cylinder to a mean position, trunnions rigid with the cylinder and journalled in bearings, vertical guides for these bearings and rigid with the underframe.

YVONNE LUCIE MESSIER,
BORN BONNAMY,
*Administratrix of the Estate of George Louis René Jean Messier, Deceased.*